Oct. 10, 1944.  G. E. FLINN  2,359,982
CLUTCH
Filed April 13, 1942  2 Sheets-Sheet 1

Inventor:
George E. Flinn
By:
Edward C. Gritzbaugh
Atty.

Oct. 10, 1944. G. E. FLINN 2,359,982
CLUTCH
Filed April 13, 1942 2 Sheets-Sheet 2
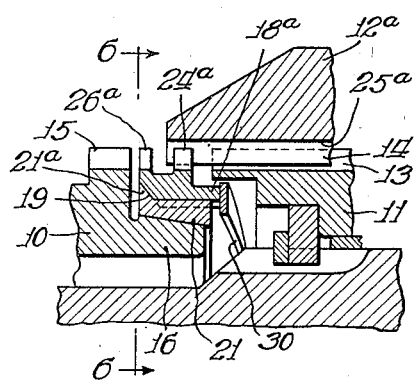
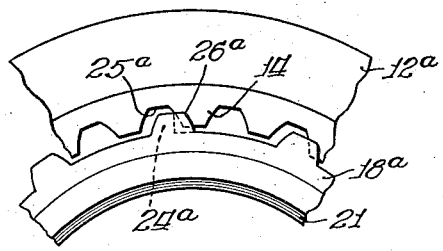
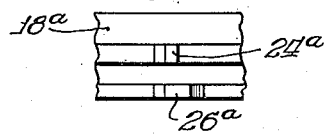
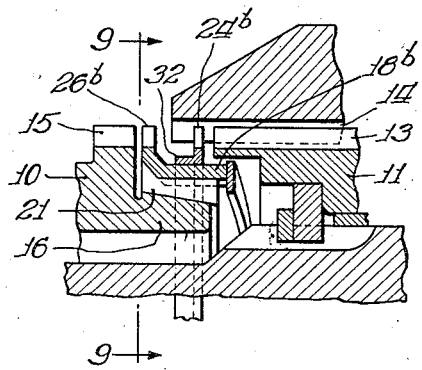
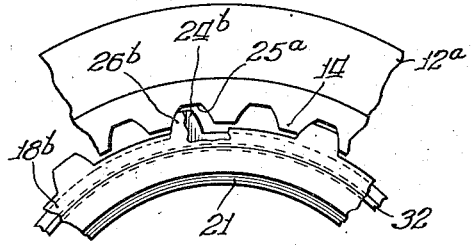
Inventor:
George E. Flinn
By: Edward C. Fritzbaugh
Atty.

Patented Oct. 10, 1944

2,359,982

UNITED STATES PATENT OFFICE 2,359,982

CLUTCH

George E. Flinn, Muncie, Ind., assignor to Borg-Warner Corporation, Chicago, Ill., a corporation of Illinois Application April 13, 1942, Serial No. 438,667

11 Claims. (Cl. 192—53)

This invention relates to clutches and has as its general object to provide improved means for preventing the engagement of a jaw clutch while differential rotation exists between the members of said clutch.

Specifically, the invention relates to a jaw clutch of the type including a pair of torque transmitting members to be synchronized having alignable peripheral teeth, and a jaw clutch sleeve meshing with the teeth of one of the members and axially slidable thereon into clutching engagement with the teeth of the other member, a blocker ring being interposed between the sleeve and the jaw clutch element with which it is engageable, to prevent clutching action as long as differential rotation exists, the ring being oscillatable relative to the sleeve from blocking to non-blocking position respectively, and means being provided for limiting such oscillating movement so as to control the blocking position.

A specific object of the invention is to provide a relatively simple and inexpensive blocking mechanism of this general type. In general, this object is attained by utilizing a space between adjacent teeth of the sleeve as a recess into which a lug on the blocker ring is extended to provide the oscillatable lost motion connection between the ring and sleeve, and by forming the blocking element in a plane spaced axially from such lost motion lug. By forming the lost motion lug in a plane spaced axially from that of the blocking element, machining of the lug and the blocker element is facilitated.

Other objects, the advantages and uses of the invention will become more apparent after reading the following specification and claims, and after consideration of the drawings forming a part of the specification, wherein:

Fig. 5 is an axial sectional view of a portion of a clutch mechanism embodying a modified form of the invention;

Fig. 6 is a transverse sectional view of the same taken on the line 6—6 of Fig. 5;

Fig. 7 is a plan view of a portion of the blocker ring of Fig. 6;

Fig. 8 is an axial sectional view showing a further modification of the invention;

Fig. 9 is an end view of the same taken as indicated by the line 9—9 of Fig. 8.

Figure 1:
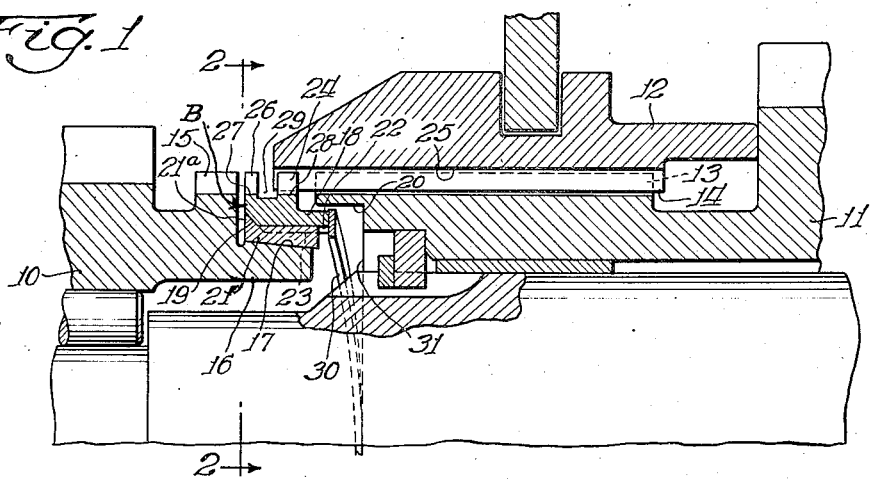
Fig. 1 is an axial sectional view of a portion of a clutch mechanism embodying my invention.

As an example of one form in which the invention may be embodied, I have shown in Fig. 1 a portion of a transmission of the type disclosed in the pending application of J. M. Simpson and H. E. Carnagua, Serial No. 403,196, filed July 19, 1941. In this transmission, drive is adapted to be transmitted from a torque transmitting member 10 to a torque transmitting member 11 through the medium of a jaw clutch sleeve 12. The member 11 has external splines 13 and the sleeve 12 has internal teeth 14 meshing with the splines 13. The sleeve 12 is adapted to be shifted axially to mesh the end portions of the teeth 14 with jaw clutch teeth 15 on the torque transmitting member 10.

The torque transmitting member 10 is provided with a friction clutch element 16 of smaller diameter than the clutch teeth 15 and having a conical external friction clutch face 17. Interposed between the torque transmitting member 11 and the torque transmitting member 10 is a blocker synchronizer B including a blocker ring 18, one end of which is internally chamfered as at 19. The ring 18 is received in an axially extending recess 20 in the torque transmitting member 11. The blocker synchronizer B also includes a friction facing 21 having an internal friction surface arranged to coact with the friction surface 17 of the element 16. The blocker ring 18 has internal splines 22 press-fitted into grooves 23 in the exterior surface of the facing 21. The facing 21 has a radially outwardly extending flange 21a abutted against the chamfered face 19 of the blocker ring to receive thrust therefrom.

The blocker ring 18 is provided with radially outwardly extending lugs 24 which are received in spaces 25 between adjacent teeth 14 of the sleeve 12 to form a driving connection between the sleeve 12 and the blocker synchronizer. The spaces 25 are enlarged by the removal of one of the teeth 14 for each of these spaces. This provides for a limited amount of oscillatory movement between the blocker synchronizer B and the sleeve 12.

Figure 2:
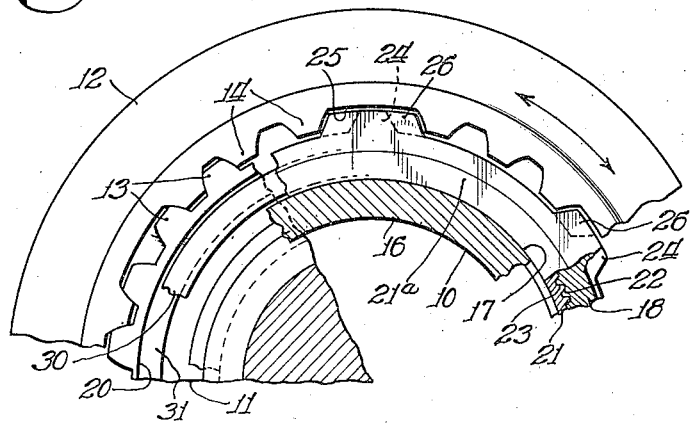
Fig. 2 is a transverse sectional view of the same taken on the line 2—2 of Fig. 1, parts being broken away to better illustrate the construction.

The blocker ring 18 is formed with a plurality of radially outwardly extending blocking elements 26 adapted, when the blocker synchronizer is at either limit of its lost motion driving connection with the sleeve 12 to block the path of movement of an adjacent tooth 14 toward the clutch element 15, and, when the blocker ring is in a neutral or centered position as shown in Fig. 2, to be received in the space 25 so as to permit the sleeve 12 to advance into clutching engagement with the clutch element 15. In order that the blocking elements 26 may be received in the spaces 25, they must be in axial alignment with the driving lugs 24. At the same time, in order that the blocking elements 26 may perform their blocking function, they must extend circumferentially beyond the lost motion driving lug 24. In order to permit this arrangement and at the same time avoid machining difficulties, the invention provides for forming the blocking elements 26 and the lugs 24 respectively in two flanges 27 and 28 which are separated axially by an annular space 29.

The driving lugs 24 are centered circumferentially with reference to the blocking elements 25 so that the latter are provided with blocking portions extending in both directions, thus providing a blocking action in either direction of relative rotation between the members to be synchronized.

Figure 3:
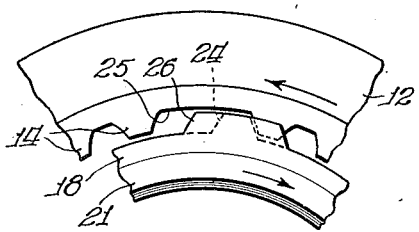
Fig. 3 is a view of a portion of the mechanism shown in Fig. 2, with the parts in blocking position.
Figure 4:
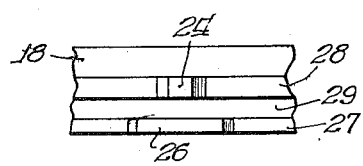
Fig. 4 is a detail plan view of a portion of the blocker ring of Fig. 1.

A constant light engagement is maintained between the friction members 16 and 21 by means of an annular loading spring 30 which is distorted axially and engaged between the blocker ring 18 and the shoulder 31 at the base of the recess 20. As a result, the blocker synchronizer will be maintained constantly in the blocking position shown in Fig. 3 except at the instant of synchronization, as will be pointed out hereinafter.

In the operation of the transmission, when the sleeve 12 is shifted toward clutching engagement with the teeth 15, the forward ends thereof will engage the blocking elements 26 and exert axial pressure thereagainst, causing the friction facing 21 to grip the friction cone 16 tightly and effect synchronization of the torque transmitting members. When synchronization occurs, there will be a reversal of the relative direction of rotation of the members, carrying the blocker synchronizer B to the neutral position shown in Fig. 2, in which the blocking lugs 26 may be received in the spaces 25 between adjacent teeth 14 of the sleeve. Thereupon the sleeve may be advanced to its position of clutching engagement with the teeth 15.

In the modified form of the invention shown in Figs. 5 and 6, the construction is the same as that shown in Figs. 1 and 2 with the exception that the driving lugs 24a of the blocker ring 18a are only substantially half the width of a clutch tooth 15, the blocking elements 26a are of the same circumferential dimension as the clutch teeth 15, and the spaces 25a between teeth 14 of the sleeve 12a are of a single tooth width, i. e., the normal involute space form. In this form of the invention, blocking is effected only in one direction, i. e., when the driving member 10 is rotating faster than the driven member 11.

The form of the invention shown in Fig. 8 is likewise a one-way blocker and differs from the form shown in Figs. 5 and 6 in that the lost motion lugs 24b are formed in a separate collar 32 which may be of stamped sheet metal welded onto the blocker ring 18b. The blocker teeth 26b are of the same circumferential extent as the teeth 15, as in the form shown in Figs. 5 and 6.

The blocker will function to block the sleeve out of clutching position when the transmission is operating under either a forward drive load or a coast load, i. e., when the drive shaft is rotating either faster or slower than the driven member 11.

I claim:

1. In a clutch mechanism, in combination with a pair of torque transmitting members to be synchronized, each having radially outwardly extending teeth, a jaw clutch sleeve having internal teeth meshing with the teeth of one of said members and axially slidable thereon into clutching engagement with the teeth of the other member, and a blocker ring having a radially outwardly extending lug received in a space between adjacent sleeve teeth to provide for limited oscillating movement of said ring relative to said sleeve, and having a radially outwardly extending blocker element adapted when said blocker ring is at one limit of such oscillating movement to be disposed in blocking relation to the end of one of said sleeve teeth and, when the blocker ring is in another position of said oscillating movement, to be received between adjacent sleeve teeth so as to permit said sleeve to advance to clutching position, said blocking element and lost motion lug being disposed in planes that are spaced axially from each other.

2. In a clutch mechanism, in combination with a pair of torque transmitting members to be synchronized, each having radially outwardly extending teeth, a jaw clutch sleeve having internal teeth meshing with the teeth of one of said members and axially slidable thereon into clutching engagement with the teeth of the other member, and a blocker ring having a radially outwardly extending lug received in a space between adjacent sleeve teeth to provide for limited oscillating movement of said ring relative to said sleeve, and having a radially outwardly extending blocker element axially aligned with said lug, adapted, when said blocker ring is at one limit of said oscillating movement, to block the path of movement of one of said sleeve teeth toward clutching position and, when said blocker ring is in another position of said oscillating movement, to be received in said space so as to permit the sleeve to advance to clutching position.

3. A clutch mechanism as defined in claim 1, including means for causing said blocker ring to tend to rotate with said other torque transmitting member so as to maintain said blocking relation as long as differential rotation exists between said members.

4. A clutch mechanism as defined in claim 1, in which said blocker element and lug are formed in axially spaced integral flanges of said blocker ring.

5. A clutch mechanism as defined in claim 1, wherein said blocking element is formed in an integral flange of said blocker ring and said lug is formed in a separate stamped sheet metal collar encircling and secured to said blocker ring.

6. In a clutch mechanism, in combination with a pair of torque transmitting members to be synchronized, one having radially outwardly extending splines and the other having radially outwardly extending jaw clutch teeth and a friction clutch element, a jaw clutch sleeve having internal teeth meshing with said splines and axially slidable thereon into clutching engagement with said jaw clutch teeth, and a blocker synchronizer interposed between said sleeve and said other member, having a friction clutching portion adapted under axial pressure to coact with said friction clutch element for synchronizing said members, having a radially outwardly extending lug received between adjacent sleeve teeth to provide for limited oscillating movement of said blocker synchronizer relative to said sleeve, and having a radially outwardly extending blocker element arranged to be disposed in blocking relation to one of said sleeve teeth when said blocker synchronizer is at one limit of said oscillating movement, whereby to receive from said sleeve axial thrust for developing said synchronizing action, said blocker element being adapted, in another position of said oscillating movement, to be received between adjacent sleeve teeth so as to permit the sleeve to advance to clutching position, said blocker element and lug being disposed in planes that are axially spaced from each other.

7. A clutch mechanism as defined in claim 6, wherein said blocker synchronizer includes a blocker ring in which said blocking element and lug are integrally formed, and wherein said friction clutching portion is in the form of a separate clutch facing secured within said blocker ring.

8. A clutch mechanism as defined in claim 6, wherein said blocker synchronizer includes a stamped sheet metal blocker ring having a flange in which said blocking element is integrally formed at one end thereof, and wherein said friction clutching portion is in the form of a separate friction facing secured within said ring.

9. In a clutch mechanism, in combination with a jaw clutch element and a torque transmitting member to be synchronized therewith, a jaw clutch sleeve member mounted on said torque transmitting member drivingly connected thereto and axially slidable thereon into clutching engagement with said jaw clutch element, and a blocker ring interposed between said sleeve and said jaw clutch element, said ring having a lug cooperating with the sleeve to provide a lost motion driving connection between said ring and sleeve, and having a blocker portion adapted, when said ring is at one limit of said lost motion connection, to be disposed in blocking relation to said sleeve, said lug and blocker portion being spaced axially from each other.

10. In a transmission, in combination with a pair of torque transmitting members to be synchronized, having alignable external teeth, a jaw clutch sleeve having internal teeth meshing with the teeth of one of said members and slidable axially into clutching engagement with the teeth of the other of said members, and a blocker ring interposed between said sleeve and said other member, having an external lug received in a space between adjacent teeth of said sleeve to provide an oscillatory lost motion driving connection between said ring and sleeve, and having an external blocker portion adapted, when said ring is at one limit of said lost motion, to be disposed in blocking relation to said sleeve, said blocker portion being spaced axially from said lug.

11. A transmission as defined in claim 1, wherein there are a plurality of said lugs, each of tooth form and dimensions corresponding to those of said members, and wherein sleeve teeth are cut away to provide the spaces in which said lugs are received.

GEORGE E. FLINN.